United States Patent [19]

Davis, Jr. et al.

[11] Patent Number: 4,950,421

[45] Date of Patent: * Aug. 21, 1990

[54] DEWAR CRYOPUMPING USING MOLECULAR SIEVE

[75] Inventors: John A. Davis, Jr., Santa Barbara; Leonard E. Peck; Wesson P. Sargent, both of Goleta; Benjamin K. Rich, Santa Barbara, all of Calif.

[73] Assignee: Santa Barbara Research Center, Goleta, Calif.

[*] Notice: The portion of the term of this patent subsequent to Dec. 12, 2006 has been disclaimed.

[21] Appl. No.: 260,169

[22] Filed: Oct. 20, 1988

[51] Int. Cl.$^5$ .............................................. G01J 5/06
[52] U.S. Cl. ...................................... 250/352; 62/51.1
[58] Field of Search ........................... 250/352, 370.15; 62/514 R

[56] References Cited

U.S. PATENT DOCUMENTS

| | | |
|---|---|---|
| 2,951,944 | 9/1960 | Fong .................................. 250/352 |
| 3,261,801 | 7/1966 | Wormuth . |
| 3,356,846 | 12/1967 | Rupert et al. ...................... 250/352 |
| 4,081,397 | 3/1978 | Booe . |
| 4,194,119 | 3/1980 | Mac Kenzie ...................... 250/352 |
| 4,344,302 | 8/1982 | Jarrett et al. ..................... 62/514 |
| 4,474,036 | 10/1984 | Ball et al. ......................... 250/352 |
| 4,500,584 | 2/1985 | Modic . |
| 4,501,131 | 2/1985 | Gaskin et al. .................... 62/514 |
| 4,719,353 | 1/1988 | Peck, Jr. et al. ................. 250/352 |

FOREIGN PATENT DOCUMENTS

| | | |
|---|---|---|
| 2104095 | 8/1972 | Fed. Rep. of Germany . |
| 1192897 | 5/1970 | United Kingdom . |

OTHER PUBLICATIONS

Article entitled "Molecular Sieves Manufactured by Davison Chemical", pp. 6–19, (undated).
Article entitled "Davison Molecular Sieves", pp. 3–5, (undated).
Article entitled "Physical Properties of Linde 3X Molecular Sieve", 3 pgs., undated.
Bewilogua et al, "Adsorption of hydrogen, neon, and helium on 5A molecular sieve at 20.4 K and 4.2 K in the low pressure range", *Journal of Cryogenics*, vol. 16, No. 4, pp. 238–240, (1976).
Stern et al, "The Adsorption of Atmospheric Gases on Molecular Sieves at Low Pressures and Temperatures, The Effect of Preadsorbed Water", *The Journal of Vacuum Science and Technology*, vol. 4, No. 6, pp. 347–355, (no date given).

*Primary Examiner*—Carolyn E. Fields
*Attorney, Agent, or Firm*—W. C. Schubert; W. K. Denson-Low

[57] ABSTRACT

A non-evacuated dewar 10 advantageously employs a molecular sieve 30 that serves to adsorb gasses in the dewar when cooled during operation of the detector 24 thereby preventing liquid formation onto the detector. The effects of outgassing and permeation during storage are substantially eliminated because the dewar package is in partial pressure equilibrium with its environment since the interior of the dewar is backfilled with the same inert gas as is in the surrounding outside environment. A second molecular sieve 40 may be used to adsorb moisture which may permeate into the housing.

13 Claims, 1 Drawing Sheet

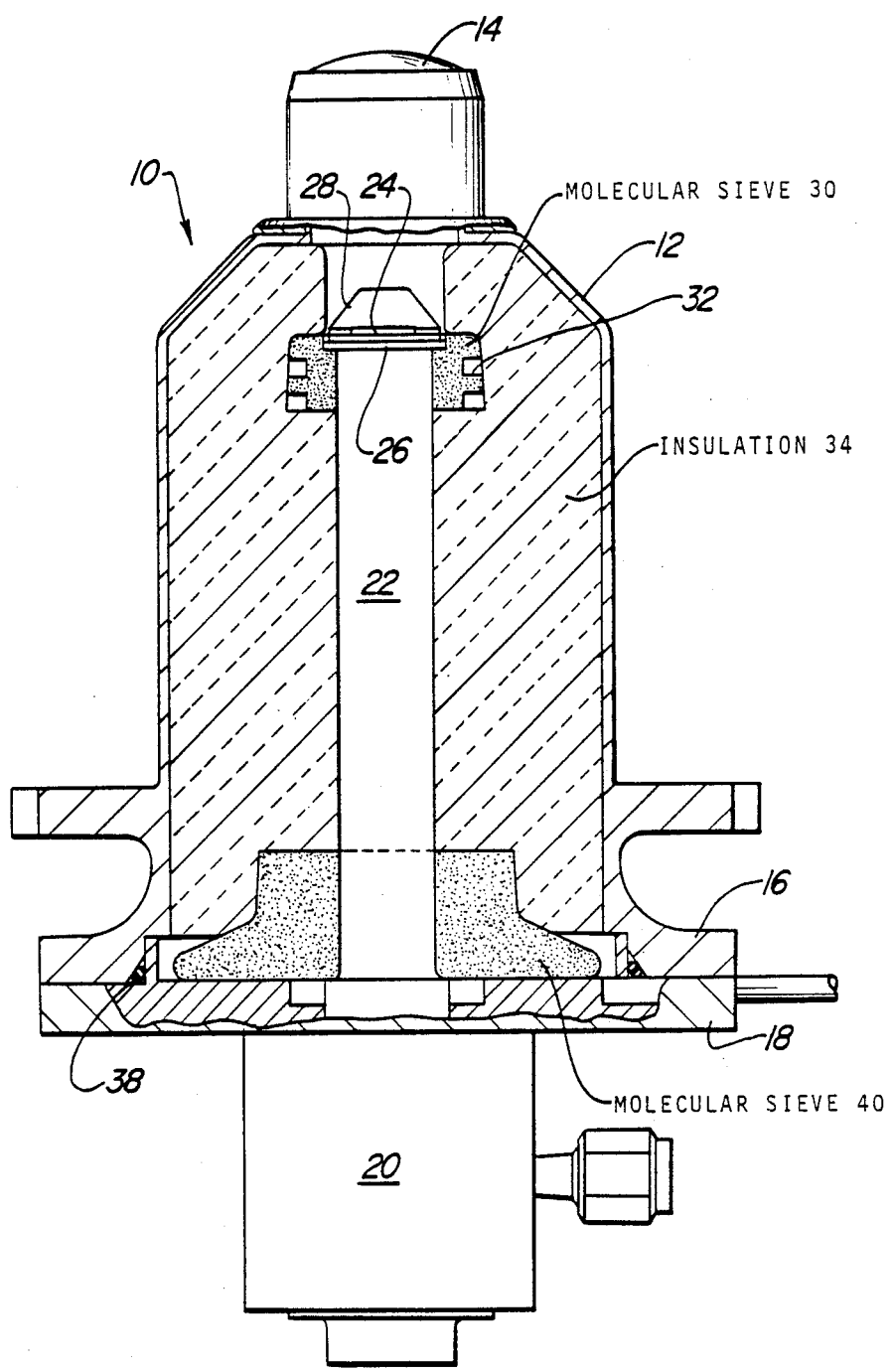

DEWAR CRYOPUMPING USING MOLECULAR SIEVE

BACKGROUND OF THE INVENTION

1. Technical Field

This invention relates to hermetically sealed packages and, more particularly, to dewars containing infrared detectors.

2. Discussion

Some sensors, particularly mercury-cadmiumtelluride infrared detectors, are most sensitive when operating at approximately 77° K. These detectors are typically used in conjunction with an evacuated dewar in which the detector is placed. The evacuation of the dewar is used to remove gasses which would otherwise occupy the region surrounding the detector so that the potential heat loss through convection and conduction during operation is minimized, as well as to eliminate the formation of liquid onto the detector. The detector is generally mounted onto the tip of a coldfinger which is in communication with a cryoengine assembly. During operation the cryoengine serves to expand a fluid such as helium in the coldfinger which, in turn, adsorbs thermal energy causing the detector to be cooled.

While the traditional evacuated dewar has generally operated satisfactorily, it does have some drawbacks. For example, the choice of materials that are used to fabricate the dewar is somewhat limited and expensive because it is necessary to choose materials having special characteristics such as low diffusivity, low outgassing and other properties. Furthermore, implementing the necessary closure techniques required to create the vacuum inside the dewar is often costly and it is sometimes difficult to ensure that the vacuum is maintained over a long period of time.

U.S. Pat. No. 4,719,353 discloses a non-evacuated dewar in which polymeric foam is disposed between the expander or coldfinger and the housing. While the above document discloses a dewar which has its advantages, it also has its own set of shortcomings and can be further improved.

SUMMARY OF THE INVENTION

In accordance with the teachings of the preferred embodiment of this invention, cryopumping means include a molecular sieve which is mounted to the dewar coldfinger adjacent the detector. When the coldfinger is cooled by the cryoengine, it also cools the molecular sieve causing it to adsorb gas in the dewar housing next to the detector. As a result, the pressure in the dewar is reduced to prevent liquid formation on the detector as well as minimizing convection and conduction losses. These advantages are economically obtained while avoiding the problems of the traditional evacuated dewar construction.

BRIEF DESCRIPTION OF THE DRAWING

The various advantages of the present invention will become apparent to one skilled in the art after reading the following specification and by reference to the drawing in which:

FIG. 1 is a cross-sectional view of a dewar made in accordance with the teachings of the preferred embodiment of this invention.

DESCRIPTION OF THE PREFERRED EMBODIMENT

The aforementioned U.S. Pat. No. 4,719,353 discloses many of the details of a dewar of the general type to which the present invention pertains. The '353 patent is hereby incorporated by reference and the reader's attention is drawn to that patent for background information. The following specification accordingly focuses on a concise description of the contribution to the art made by this invention.

Briefly, the dewar 10 includes a housing 12 with a lens cap assembly 14 at one end thereof and a mounting flange 16 at an opposite lower end thereof. Flange 16 is suitably connected to a mounting plate 18 which, in turn, carries a suitable cryoengine 20. Cryoengine 20 is coupled to a coldfinger 22 which projects upwardly through the major extent of housing 12. An infrared detector 24 is mounted to the tip 26 of coldfinger 22. A cold shield 28 surrounds detector 24 and includes an aperture in an upper portion thereof acting as a field stop to restrict the field of view of detector 24 in a known manner.

A molecular sieve 30 is in thermal contact with the tip 26 of coldfinger 22. As will appear, the purpose of molecular sieve 30 is to remove gasses from the area adjacent detector 24 when it is operating. When detector 24 is operating, the cryoengine 20 is energized to cause fluid contained within coldfinger 22 to expand thereby absorbing thermal energy to cool detector 24 to the preferred 77° K. Molecular sieve 30 has a particular affinity for the type of gasses in the area adjacent detector 24. Preferably, the dewar housing 12 is backfilled with an inert gas such as nitrogen at one atmosphere or atmospheric pressure. Thus, the gas adjacent detector 24 is predominately nitrogen in the preferred embodiment. However, other gasses such as argon and xenon can be alternatively used to backfill the package.

Molecular sieve 30 can be made of a variety of zeolite materials such as activated crystalline silicoaluminate with organic binders. This preferred material is commercially available from Multiform Desiccants under the trade designation NATRASORB 900. It is approximately 0.100 inch thick and about 0.400 inch in diameter. Sieve 30 is attached to the outer walls of coldfinger 22 adjacent tip 26 by way of adhesive. In the drawing, sieve 30 is shown with a plurality of annular grooves 32 which are for the purpose of increasing surface area to enhance gas adsorption.

Provision is made for reducing the amount of gas adjacent detector 24 that needs to be adsorbed by the sieve 30 during operation. To this end, much of the interior space within housing 12 is filled with insulation 34. Preferably, the insulation is made of a polymeric foam such as a polystyrene composite material. As can be seen in the drawing, there is no insulation in the space above detector 24 which could otherwise block thermal radiation to be sensed by the detector. The insulation serves a variety of functions such as reducing heat loss due to gas conduction and convection until the gas is adsorbed by the sieve 30, acting as a stiffener for the coldfinger 22 and it can also aid in positioning of control cables.

The dewar 10 is typically located in an outside environment containing nitrogen gas at one atmosphere pressure. Although the dewar 10 is also backfilled with nitrogen at atmospheric pressure and is therefore at equilibrium with the outside environment when in a non-operational state, there still exists a possibility of moisture permeating the interior of package, for example, through seals 38 between the mounting flange 16 and mounting plate 18. Moisture in an appreciable amount can degrade the cryopumping operation of molecular sieve 30. To remove moisture within the housing 12 a second molecular sieve 40 with a larger surface area is contained within the dewar 10. It is preferably located at the lower end of the housing 12 adjacent the seals 38 which represent the most likely point of entry of moisture. Molecular sieve 40 likewise can be made of the same material as sieve 30.

When the detector 24 is not operating, the dewar components are substantially at room or ambient temperature, i.e., the cryoengine 20 is not functioning to cool the detector to its operating point which is below 80° K. and preferably about 77° K. In this non-operating condition, there exists nitrogen gas in the area above the detector 24 since the molecular sieve 30 is at equilibrium. Any moisture that permeates the seals and enters the interior of the dewar 12 is adsorbed primarily by the molecular sieve 40. Thus, the dewar 10 can exhibit extended shelf life. This is important since infrared detectors of this type may remain in their non-operating state for some period of time.

When it is desired to utilize the detector 24, the cryoengine 20 is operated to cool the coldfinger 22. As is known in the art, the tip 26 of coldfinger 22 is cooled more quickly than the lower portions thereof. The cooling of coldfinger tip 26 simultaneously cools the detector 24 and molecular sieve 30. The cooling of sieve 30 causes it to change from its equilibrium condition to a condition at which it adsorbs or getters gasses surrounding the detector 24. This adsorbing of gasses creates a "cryopumping" action in which the pressure in the dewar housing 12 is kept below the gas triple point, e.g., 94 torr for nitrogen, during operation of the detector 24. Thus, the possibility of a liquid forming onto the detector 24 is substantially eliminated. In addition, heat losses through convection and conduction are also substantially reduced.

When the dewar returns to its non-operational mode, the molecular sieve 30 desorbs the adsorbed gasses and the package returns to its equilibrium condition. Permeation during storage is kept to a minimum because the package is in partial pressure equilibrium with its outside environment. As noted above, moisture which may enter the package is removed by the molecular sieve 40.

Those skilled in the art can now appreciate that the present invention provides an economical, yet reliable dewar package construction that eliminates many of the problems associated with traditional evacuated dewars. It should be understood that while this invention was described in connection with one particular example, many modifications can be made thereto without departing from the spirit of this invention after having the benefit of studying the specification, drawing and following claims.

What is claimed is:

1. In a dewar having a non-evacuated housing at substantially ambient temperature and a detector mounted to the tip of a coldfinger for cooling the detector during operation thereof, the improvement comprising:

means including a molecular sieve mounted to the coldfinger adjacent the detector for adsorbing gas in the housing adjacent the detector when the coldfinger is cooled during operation of the detector; wherein the dewar is backfilled with an inert gas at substantially one atmosphere.

2. The improvement of claim 1 which further comprises:
   a second molecular sieve for adsorbing moisture in the housing.

3. The improvement of claim 2 which further comprises insulation in the housing between the coldfinger and interior walls of the housing.

4. A non-evacuated dewar comprising:
   a housing having a mounting flange at one end and a lens cap assembly at an opposite end;
   a coldfinger substantially concentrically mounted in the housing and extending from the mounting flange end and having a tip terminating adjacent to the lens cap assembly;
   an infrared detector mounted to the tip of the coldfinger;
   a molecular sieve mounted to the coldfinger adjacent to the tip thereof;
   said dewar being backfilled with an inert gas at substantially one atmosphere pressure;
   cryoengine means coupled to the coldfinger for cooling the coldfinger when it is desired to operate the infrared detector; and
   said molecular sieve comprising means to adsorb said inert gas to reduce the pressure in the housing adjacent the sensor below the gas triple point of the gas to prevent liquid forming on the detector in response to operation of the cryoengine.

5. The dewar of claim 4 which further comprises:
   second molecular sieve comprising means for adsorbing moisture that may permeate the interior of the housing.

6. The dewar of claim 5 wherein said second molecular sieve has a larger surface area than presented by the surface area of the molecular sieve adjacent to the tip of the coldfinger.

7. The dewar of claim 6 wherein said second molecular sieve is positioned in the housing adjacent the flange.

8. The dewar of claim 7 wherein said second molecular sieve surrounds the coldfinger and is spaced from the other molecular sieve by insulation.

9. The dewar of claim 8 which further comprises:
   foam insulation between the coldfinger and interior walls of the housing.

10. The dewar of claim 4 wherein said inert gas is nitrogen.

11. A method of detecting infrared radiation by a detector in a dewar mounted on a tip of a coldfinger that is selectively cooled by a cryoengine when it is desired to operate the detector, said method comprising:
    mounting a molecular sieve to the coldfinger adjacent the detector;
    backfilling the dewar with an inert gas at substantially one atmosphere pressure;
    using the cryoengine to substantially simultaneously cool the detector and molecular sieve to below about 80° K.;
    said molecular sieve adsorbing said inert gas, when cooled, sufficiently to reduce the partial pressure within the dewar to below the gas triple point of the inert gas to prevent liquid from forming on the detector; and
    using the detector array, when cooled, to sense infrared radiation incident thereon.

12. The method of claim 11 which further comprises:

mounting a second molecular sieve within the dewar; and using said second molecular sieve to adsorb moisture that may permeate the dewar.

13. The method of claim 11 wherein insulation is provided between the coldfinger and interior walls of the dewar.

* * * * *